United States Patent
Braun et al.

(10) Patent No.: US 11,329,688 B2
(45) Date of Patent: May 10, 2022

(54) SINGLE-CHIP DIGITAL PRE-DISTORTION (DPD) DEVICE IMPLEMENTED USING RADIO FREQUENCY TRANSCEIVER INTEGRATED CIRCUIT WITH INTEGRATED DPD FUNCTION

(71) Applicant: CommScope Technologies LLC, Hickory, NC (US)

(72) Inventors: Patrick Braun, Munningen (DE); Christoph Gollinger, Bayern (DE)

(73) Assignee: CommScope Technologies LLC, Hickory, NC (US)

( * ) Notice: Subject to any disclaimer, the term of this patent is extended or adjusted under 35 U.S.C. 154(b) by 0 days.

(21) Appl. No.: 17/205,575

(22) Filed: Mar. 18, 2021

(65) Prior Publication Data

US 2021/0297110 A1    Sep. 23, 2021

Related U.S. Application Data

(60) Provisional application No. 62/991,277, filed on Mar. 18, 2020.

(51) Int. Cl.
*H04B 1/40*    (2015.01)
*H04B 1/04*    (2006.01)

(52) U.S. Cl.
CPC ............ *H04B 1/40* (2013.01); *H04B 1/04* (2013.01); *H04B 2001/0425* (2013.01)

(58) Field of Classification Search
CPC .......... H04B 1/0475; H04B 2001/0425; H04B 7/15528; H04B 1/40; H04B 1/04; H04L 27/368; H03F 1/3247; H03F 2200/372

See application file for complete search history.

(56) References Cited

U.S. PATENT DOCUMENTS 8,326,239 B1   12/2012  Peiris et al.
9,002,302 B1   4/2015   Qian et al.
(Continued)

FOREIGN PATENT DOCUMENTS

KR    1020090029351 A    3/2009
WO    2019032337 A1      2/2019

OTHER PUBLICATIONS

Texas Instruments, "Using AFE77xx in a Digital Pre-Distortion System", Application Report, SBAA370A, Apr. 2019, pp. 1 through 17, Texas Instruments Incorporated.
(Continued)

*Primary Examiner* — David S Huang
(74) *Attorney, Agent, or Firm* — Fogg & Powers LLC (57) ABSTRACT

One embodiment is directed to a system that comprises a non-DPD RF transceiver circuit that does not include digital pre-distortion (DPD) functionality and a DPD RF transceiver integrated circuit that includes DPD functionality. A first analog RF transmit signal output by the non-DPD RF transceiver circuit is received by a receive signal path of the DPD RF transceiver integrated circuit so that receive baseband data generated by the receive signal path is indicative of the first analog RF transmit signal. The receive baseband data generated by the DPD RF transceiver integrated circuit is received by a transmit signal path of the DPD RF transceiver integrated circuit. A second analog RF transmit signal output by the transmit signal path is a digitally pre-distorted version of the first analog RF transmit signal for amplification by the power amplifier.

24 Claims, 6 Drawing Sheets

(56) References Cited

U.S. PATENT DOCUMENTS

| | | | |
|---|---|---|---|
| 9,008,156 B1* | 4/2015 | Dick | H03F 1/3247 |
| | | | 375/211 |
| 9,077,297 B2 | 7/2015 | Yang et al. | |
| 9,236,898 B2 | 1/2016 | Morris et al. | |
| 10,536,120 B2 | 1/2020 | Seo et al. | |
| 2011/0187455 A1* | 8/2011 | Sun | H04L 25/03343 |
| | | | 330/149 |
| 2019/0052235 A1* | 2/2019 | Seo | H03F 3/245 |

OTHER PUBLICATIONS

International Searching Authority, "International Search Report and Written Opinion from PCT Application No. PCT/US2021/022962", from Foreign Counterpart to U.S. Appl. No. 17/205,575, filed Jul. 2, 2021, pp. 1 through 15, Published: WO.

* cited by examiner

302 RECEIVE, BY RECEIVE SIGNAL PATH OF DPD RF TRANSCEIVER INTEGRATED CIRCUIT THAT INCLUDES INTEGRATED DPD FUNCTIONALITY, FIRST ANALOG RF TRANSMIT SIGNAL OUTPUT BY NON-DPD RF TRANSCEIVER CIRCUIT THAT DOES NOT INCLUDE INTEGRATED DPD FUNCTIONALITY

304 GENERATE, BY RECEIVE SIGNAL PATH OF DPD RF TRANSCEIVER INTEGRATED CIRCUIT, RECEIVE BASEBAND DATA INDICATIVE OF FIRST ANALOG RF TRANSMIT SIGNAL

306 RECEIVE, BY TRANSMIT SIGNAL PATH OF DPD RF TRANSCEIVER INTEGRATED CIRCUIT, RECEIVE BASEBAND DATA

308 GENERATE AND OUTPUT, BY TRANSMIT SIGNAL PATH OF DPD RF TRANSCEIVER INTEGRATED CIRCUIT, SECOND ANALOG RF TRANSMIT SIGNAL THAT IS A DIGITALLY PRE-DISTORTED VERSION OF FIRST ANALOG RF TRANSMIT SIGNAL

310 RECEIVE, BY TRANSMIT SIGNAL PATH OF DPD RF TRANSCEIVER INTEGRATED CIRCUIT, OBSERVATION BASEBAND DATA GENERATED FROM COUPLED VERSION OF AMPLIFIED VERSION OF RF SIGNAL OUTPUT BY POWER AMPLIFIER FOR USE BY DPD FUNCTIONALITY IN PERFORMING DPD

312 PERFORM CREST FACTOR REDUCTION FOR FIRST ANALOG RF TRANSMIT SIGNAL USING CFR FUNCTIONALITY INCLUDED IN DPD RF TRANSCEIVER INTEGRATED CIRCUIT

SINGLE-CHIP DIGITAL PRE-DISTORTION (DPD) DEVICE IMPLEMENTED USING RADIO FREQUENCY TRANSCEIVER INTEGRATED CIRCUIT WITH INTEGRATED DPD FUNCTION

CROSS-REFERENCE TO RELATED APPLICATIONS

This application claims the benefit of U.S. Provisional Patent Application Ser. No. 62/991,277, filed on Mar. 18, 2020, which is hereby incorporated herein by reference in its entirety.

BACKGROUND

A base station (also referred to as an "access point") wirelessly transmits and receives radio frequency signals to and from at least one other device. Typically, the transmitted signal is amplified using a linearized amplifier. There are many ways to linearize an amplifier for use in or with a base station.

One approach to linearizing an amplifier digitally pre-distorts the signal that is to be transmitted. An inverse model of the amplifier's nonlinear transfer characteristics is developed. The transmit signal is digitally pre-distorted by applying the inverse model to a digital version of the transmit signal prior to its conversion to an analog signal and amplification using the amplifier. Applying the inverse model to the digital version of the transmit signal pre-distorts the transmit signal in a manner that is intended to be equal to and opposite from the distortion introduced during amplification so that the resulting final amplified signal appears undistorted.

This compensation for the distortion caused by the amplifier is particularly necessary when the amplifier is operated at high output levels (that is, close to saturation). Operating the amplifier at high output levels typically provides higher efficiency and lower costs.

To account for variations in the transfer characteristics of the amplifier, the inverse model used for digital pre-distortion (DPD) is updated based on a real-time comparison of the amplifier's input and output signals. To make this comparison, the analog radio frequency (RF) output signal output by the amplifier is measured.

The drawbacks of this approach to implementing DPD are the high price and power consumption of the processing device used to implement the DPD function, the digital-to-analog converter used to convert the pre-distorted transmit signal to an analog input signal for the amplifier, and the analog-to-digital converter used to digitize a version of the output signal produced by the amplifier. These drawbacks reduce the overall efficiency of the amplifier. To attempt to reduce these drawbacks and improve the efficiency of the resulting amplifier, some integrated circuit vendors have integrated such DPD functionality into RF transceiver chipsets used in base stations. That is, the DPD processing that produces the pre-distorted digital transmit signal, the digital-to-analog converter that converts the pre-distorted digital transmit signal to an analog input signal for the amplifier, and the analog-to-digital converter that digitizes a version of the output signal produced by the amplifier are all integrated into a single integrated circuit built using power-efficient application-specific integrated circuit (ASIC) technology.

Figure 1:
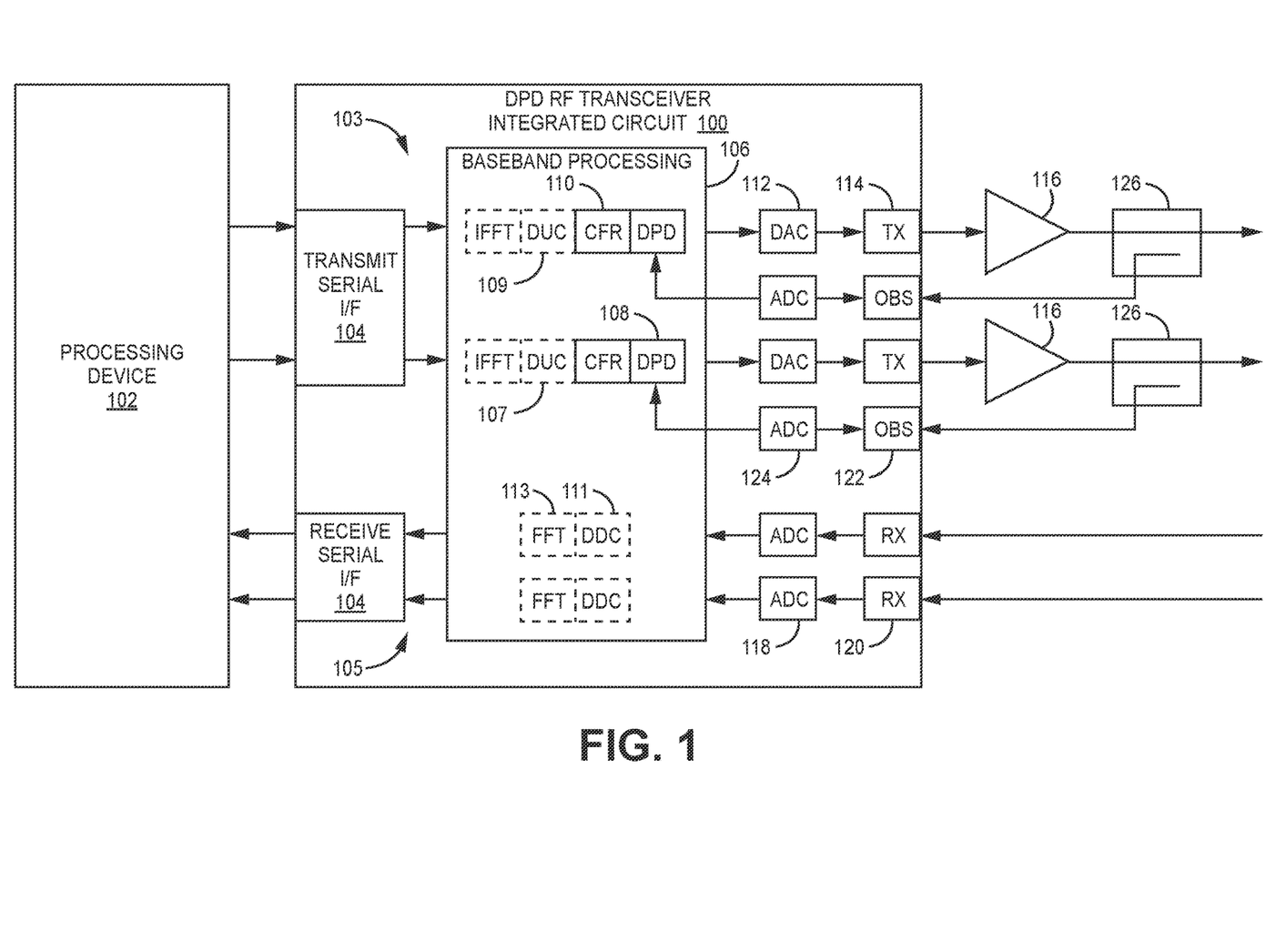
FIG. 1 is a block diagram illustrating one example of an radio frequency (RF) transceiver integrated circuit with integrated digital pre-distortion (DPD) functionality.

One example of such an RF transceiver integrated circuit 100 with integrated DPD functionality is shown in FIG. 1. A two-channel RF transceiver integrated circuit 100 is shown in FIG. 1. The RF transceiver integrated circuit 100 can transmit two transmit signals and receive two receive signals (for example, the two transmit and two receive streams used for a 2×2 multiple-input-multiple-output (MIMO) wireless channel). As shown in FIG. 1, baseband processing for the transmit and receive signals processed by the RF transceiver integrated circuit 100 is performed by an external processing device 102 (such as a field-programmable gate array (FPGA) or a digital signal processor (DSP)).

The RF transceiver integrated circuit 100 includes serial interfaces 104 configured to couple the RF transceiver integrated circuit 100 to the external processing device 102. In the embodiment shown in FIG. 1, the serial interfaces 104 support the JESD204B standard promulgated by the Joint Electron Device Engineering Council (JEDEC). Such serial interface 104 are also referred to here as "JESD204B interfaces" 104. Although the example shown in FIG. 1 is described here as being implemented using serial interfaces (and more specifically JESD204B interfaces), it is to be understood that the RF transceiver integrated circuit 100 can be coupled to the external processing device 102 using other types or numbers of serial or parallel interfaces. For example, in one alternative example, multiple parallel high-speed interfaces can be used, where a separate parallel high-speed interface is provided for each transmit channel and for each receive channel.

In the example shown in FIG. 1, in the transmit signal path 103, transmit baseband data for both transmit channels is supplied from the processing device 102 via one of the JESD204B interfaces 104 (where this interface 104 also referred to here as the "transmit" serial interface 104 or "transmit JESD204B interface 104"). The transmit baseband data for each transmit channel can be supplied from the processing device 102 in other ways (for example, using a separate parallel high-speed interface for each transmit channel if multiple parallel high-speed interfaces are used to couple the RF transceiver integrated circuit 100 to the external processing device 102). The RF transceiver integrated circuit 100 includes a baseband processing module 106 that processes the transmit and receive baseband data for each channel. In the example shown in FIG. 1, the baseband processing module 106 implements a DPD function 108 and a crest factor reduction (CFR) function 110 that process the transmit baseband data for each channel by performing DPD and CFR, respectively, on that transmit baseband data. It is to be understood that the baseband processing module 106 can also implement other types of processing such as inverse fast Fourier transform processing (iFFT) 107 and/or digital up conversion (DUC) 109 in the case of the transmit signal path or digital down conversion (DDC) 111 and/or fast Fourier transform processing (FFT) 113 in the case of the receive signal path.

In the transmit signal path 103, the RF transceiver integrated circuit 100 includes a respective digital-to-analog conversion (DAC) module 112 for each of the two channels supported by the RF transceiver integrated circuit 100. Any conventional DAC device can be used to implement the DAC module 112 (for example, a DAC device that outputs a real intermediate frequency (IF) analog signal, a DAC device that outputs complex IF analog signals, or a DAC device that directly outputs an RF analog signal). The resulting processed transmit baseband data for each channel is output to the respective digital-to-analog conversion module 112. Each digital-to-analog conversion module 112 is configured to convert the transmit baseband data to an analog signal, quadrature modulate (if necessary), upconvert the analog signal to the desired RF frequency (if necessary), filter the upconverted RF signal, and output the filtered RF signal on a respective analog transmit (TX) port 114 included in the RF transceiver integrated circuit 100. Each transmit port 114 is coupled to a respective external power amplifier 116, which amplifies the respective analog transmit RF signal that is output on that transmit port 114 for wireless transmission via an external antenna (not shown).

In the receive signal path 105, the RF transceiver integrated circuit 100 includes a respective analog-to-digital conversion (ADC) module 118 for each of the two channels supported by the RF transceiver integrated circuit 100. An analog RF signal received via an external antenna (not shown) is input via a receive (RX) port 120 included in the RF transceiver integrated circuit 100. The analog RF receive signal can be amplified (for example, using a suitable external low-noise amplifier (LNA) (not shown)) and filtered (for example, using a suitable external band-pass filter (not shown)) prior to being input via the receive port 120.

Each analog-to-digital conversion module 118 is configured to convert the analog RF receive signal to receive baseband data and output it for baseband processing by the baseband processing module 106. In the receive signal path 105, the baseband processing module 106 is configured to output the resulting receive baseband data to the processing device 102 via one of the JESD204B interfaces 104 (where this interface 104 is also referred to here as the "receive" serial interface 104 or the "receive" JESD204B interface 104).

In the example shown in FIG. 1, for each of the two channels supported by the RF transceiver integrated circuit 100, the RF transceiver integrated circuit 100 includes a respective observation receive port 122 coupled to a respective observation analog-to-digital conversion (ADC) module 124 for each of the two channels. A respective external RF coupler 126 is coupled to the output of the respective external power amplifier 116 for each channel. Each RF coupler 126 outputs a coupled signal that is a version of the analog RF output signal output by the associated power amplifier 116. The coupled signal output by each RF coupler 126 is received by the RF transceiver integrated circuit 100 via a respective observation receive (OBS) port 122. Each observation analog-to-digital conversion (ADC) module 124 is configured to convert, to digital baseband data, the corresponding analog coupled RF signal received via the corresponding observation receive port 122. The baseband data for each received coupled signal is output for baseband processing by the baseband processing module 106. More specifically, the baseband data for each received coupled signal is used by the DPD function 108 to update the inverse model used in performing DPD on the transmit baseband data for that channel. As noted above, the inverse model of the nonlinear transfer characteristics of the corresponding power amplifier 116 is updated in order to account for variations in the transfer characteristics of the corresponding power amplifier 116. The inverse model is updated based on a real-time comparison of the corresponding power amplifier's input and output signals. Coefficients used to implement the inverse model of the nonlinear transfer characteristics of the corresponding power amplifier 116 are updated based on the difference between the pre-distorted digital version of the transmit signal (which, after conversion to an analog signal, is input to the corresponding power amplifier 116) and the digital coupled signal (which is a version of the output of the corresponding power amplifier 116).

It is to be understood that the OBS receiver architecture can be implemented in other ways. For example, a shared OBS receiver architecture can be used. In one such example, a single OBS port 122 and observation ADC module 124 can be provided for use with both transmit channels by including an RF switch between the outputs of the two corresponding RF couplers 126 and the OBS port 122, where the RF switch is controlled to determine which transmit channel is being observed. In another example of a shared OBS receiver architecture, a single observation ADC module 124 can be provided for use with both transmit channels and for use with two OBS ports 122 by including an RF switch between the two OBS ports 122 and the input of the single ADC module 124, where the RF switch is controlled to determine which transmit channel is being observed.

Although the phrase "baseband data" is used to refer to the digital data that is output by the baseband processing module 106 to the DAC modules 112 and the digital data that is output by the ADC modules 118 and 124 to the baseband processing module 106, it is to be understood that this data is output in a form that is appropriate for how the DAC modules 112, the ADC modules 118 and 124, and the baseband processing module 106 are implemented. Also, the form in which the baseband data is output by the baseband processing module 106 to the DAC modules 112 can differ from the form in which the digital data is output by the ADC module 118 and 124 to the baseband processing module 106.

RF transceiver integrated circuits with integrated DPD functions of the type shown in FIG. 1 are typically designed to be used in base stations where the transmit signal path is used for generating analog transmit signals that are wirelessly transmitted via corresponding antennas and power amplifiers and the receive signal path is used for receiving analog receive signals that are wirelessly received via corresponding antennas and low-noise amplifiers.

SUMMARY

One embodiment is directed to a system for performing digital pre-distortion (DPD) for a first analog radio frequency (RF) transmit signal and a power amplifier. The system comprises a non-DPD RF transceiver circuit that does not include DPD functionality. The non-DPD RF transceiver circuit is configured to output the first analog RF transmit signal. The system further comprises a DPD RF transceiver integrated circuit that comprises a transmit signal path configured to output a second analog RF transmit signal generated from transmit baseband data input to the transmit signal path. The transmit signal patch comprises integrated DPD functionality. The DPD RF transceiver integrated circuit further comprises a receive signal path configured to output receive baseband data generated from an analog RF receive signal input to the receive signal path. The system is configured so that the first analog RF transmit signal output by the non-DPD RF transceiver circuit is received by the receive signal path of the DPD RF transceiver integrated circuit so that the receive baseband data generated by the receive signal path is indicative of the first analog RF transmit signal. The system is configured so that the receive baseband data generated by the DPD RF transceiver integrated circuit is received by the transmit signal path of the DPD RF transceiver integrated circuit. The second analog RF transmit signal output by the transmit signal path is a digitally pre-distorted version of the first analog RF transmit signal for amplification by the power amplifier.

Another embodiment is directed to a method of performing digital pre-distortion (DPD) for a first analog radio frequency (RF) transmit signal and a power amplifier. The method comprises receiving, by a receive signal path of a DPD RF transceiver integrated circuit that includes integrated DPD functionality, the first analog RF transmit signal output by a non-DPD RF transceiver circuit that does not include DPD functionality. The method further comprises generating, by the DPD RF transceiver integrated circuit, receive baseband data indicative of the first analog RF transmit signal, receiving the receive baseband data by a transmit signal path of the DPD RF transceiver integrated circuit, and generating and outputting, by the transmit signal path, a second analog RF transmit signal generated from the transmit baseband data. The second analog RF transmit signal output by the transmit signal path is a digitally pre-distorted version of the first analog RF transmit signal for amplification by the power amplifier.

Other embodiments are disclosed.

The details of various embodiments are set forth in the accompanying drawings and the description below. Other features and advantages will become apparent from the description, the drawings, and the claims.

DRAWINGS

Like reference numbers and designations in the various drawings indicate like elements.

DETAILED DESCRIPTION

Figure 2:
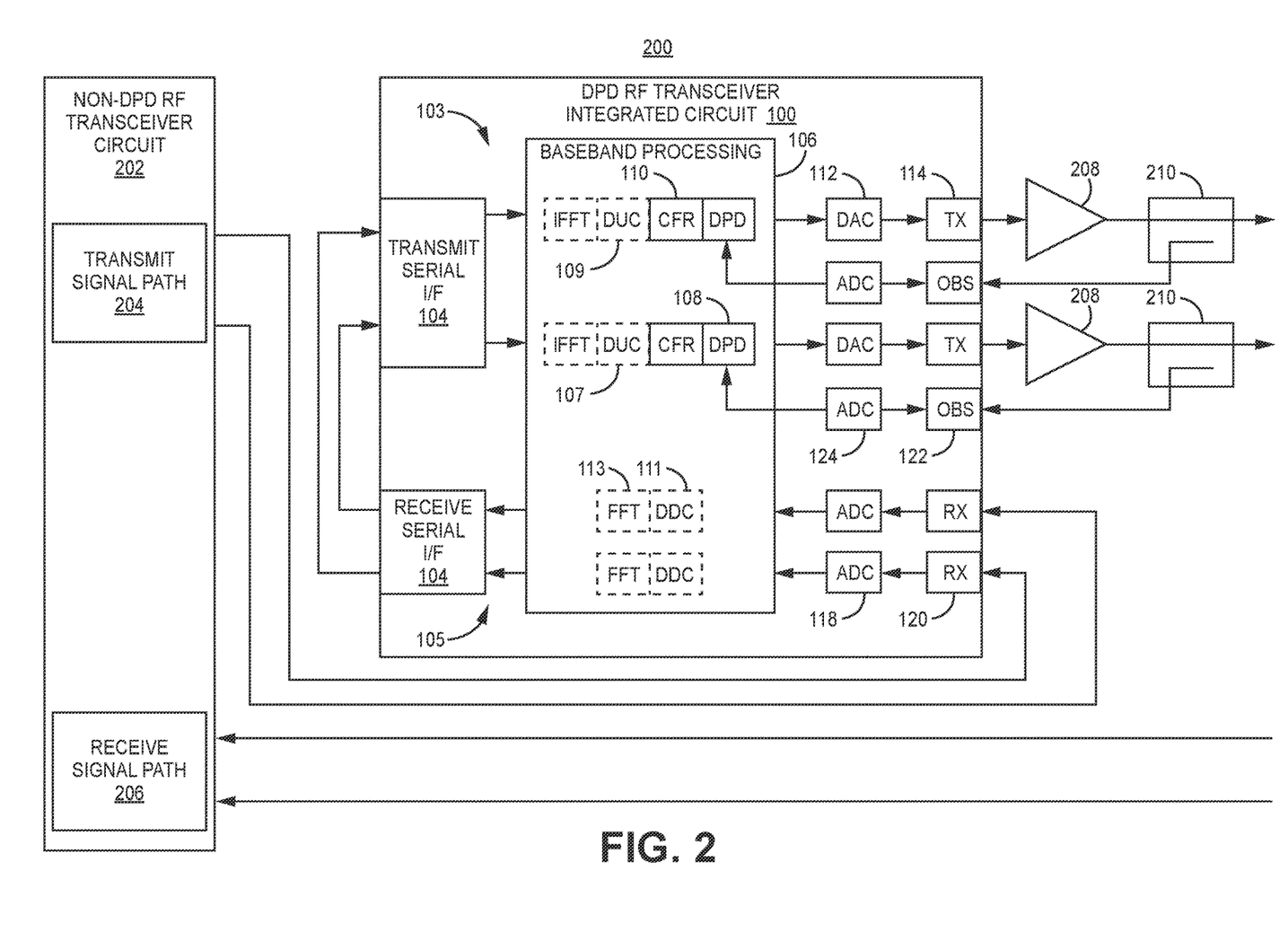
FIG. 2 is a block diagram illustrating one example embodiment of how a system in which an RF transceiver integrated circuit that has integrated DPD functionality can be used with another RF transceiver.

FIG. 2 is a block diagram illustrating one example embodiment of how a system 200 in which an RF transceiver integrated circuit 100 that has integrated digital pre-distortion (DPD) functionality 108 can be used with another RF transceiver 202 (for example, one that does not itself include DPD functionality) in order to easily implement DPD functionality for that other RF transceiver 202. The RF transceiver integrated circuit 100 with integrated DPD functionality 108 is also referred to here as the "DPD" RF transceiver integrated circuit 100, and the other RF transceiver 202 is also referred to here as the "non-DPD" RF transceiver 202.

In the embodiment shown in FIG. 2, the DPD RF transceiver integrated circuit 100 is implemented using the RF transceiver integrated circuit 100 described above in connection with FIG. 1. The same reference numbers used in FIG. 1 are also used in FIG. 2 to refer to the same items of the DPD RF transceiver integrated circuit 100, the description of which is generally not repeated here for the sake of brevity. It is to be understood that the description of various alternative examples and implementations set forth above with respect to FIG. 1 also generally applies to the embodiment shown in FIG. 2.

As noted above, the DPD RF transceiver integrated circuit 100 is designed for use in a base station as described above in connection with FIG. 1. That is, the DPD RF transceiver integrated circuit 100 is designed to receive, for each channel, respective transmit baseband data from an external processing device via its transmit JESD204B interface 104 and use the respective transmit baseband data to generate a digitally pre-distorted analog RF transmit signal for that channel that it outputs via one of its transmit ports 114. Also, as noted above, the DPD RF transceiver integrated circuit 100 is designed to receive, for each channel, a respective analog RF receive signal via one of its receive ports 120 and use the received analog RF receive signal to generate receive baseband data for that channel that it outputs via its receive JESD204B interface 104 to the external processing device.

However, in the embodiment shown in FIG. 2, the DPD RF transceiver integrated circuit 100 is not used in the manner for which it was designed. In this embodiment, the transmit signal path 204 and the receive signal path 206 in the non-DPD RF transceiver 202 performs the "normal" transmit and receive processing for the analog RF transmit and receive signals, whereas the transmit and receive signal paths 103 and 105 of the DPD RF transceiver integrated circuit 100 are used for performing DPD for the analog RF transmit signal output by the transmit signal path 204 of the non-DPD RF transceiver 202.

More specifically, instead of using the DPD RF transceiver integrated circuit 100 in the manner for which it was designed, for each channel of the DPD RF transceiver integrated circuit 100, the transmit signal path 204 in the non-DPD RF transceiver 202 generates a respective analog transmit RF signal (also referred to here as the "first analog RF transmit signal") that would otherwise be supplied directly to a respective power amplifier 208. Instead of being supplied directly to the power amplifier 208, the first analog transmit RF signal generated and output by the transmit signal path 204 of the non-DPD RF transceiver 202 for each channel is supplied to the DPD RF transceiver integrated circuit 100 on a respective one of the receive (RX) ports 120 of the DPD RF transceiver integrated circuit 100. For each channel, the receive signal path 105 of the DPD RF transceiver integrated circuit 100 generates baseband data. In the embodiment shown in FIG. 2, for each channel, the first analog transmit RF signal generated and output by the non-DPD RF transceiver 202 for that channel is converted to baseband data by a respective analog-to-digital conversion (ADC) module 118 included in the DPD RF transceiver integrated circuit 100. The resulting baseband data is supplied to the baseband processing module 106 in the DPD RF transceiver integrated circuit 100 for baseband processing. The baseband processing module 106 in the DPD RF transceiver integrated circuit 100 is configured to process the baseband data so that it can be output on the receive JESD204B interface 104.

Instead of being provided to an external processing device as described above in connection with FIG. 1, the baseband data that is generated in each channel of the receive signal path 105 of the DPD RF transceiver integrated circuit 100

(from the first analog transmit RF signal generated and output by the non-DPD RF transceiver 202 for that channel) is provided to the transmit signal path 103 of that same DPD RF transceiver integrated circuit 100 via the transmit JESD204B interface 104. In the example shown in FIG. 2, the receive JESD204B interface 104 is coupled to the transmit JESD204B interface 104 (for example, using an appropriate cable or traces on a circuit board) so that the baseband data output on the receive JESD204B interface 104 for each channel is received on the transmit JESD204B interface 104 of that same DPD RF transceiver integrated circuit 100. It is to be understood that the looping back of the baseband data generated in each channel of the receive signal path 105 to the transmit signal path 103 of the same DPD RF transceiver integrated circuit 100 can be implemented entirely within the DPD RF transceiver integrated circuit 100. For example, in one such alternative implementation, the baseband data generated in baseband processing module 106 for each channel of the receive signal path 105 is looped back to the transmit signal path 103 internally within the baseband processing module 106 without the use of the interfaces 104 (for example, by programming the baseband processing module 106 appropriately). In another alternative implementation, the baseband data generated in baseband processing module 106 for each channel of the receive signal path 105 is looped back to the transmit signal path 103 using signal paths provided between the serial interfaces 104 internally within the DPD RF transceiver integrated circuit 100.

For each channel, the transmit signal path 103 of that DPD RF transceiver integrated circuit 100 uses the provided baseband data to generate a digitally pre-distorted analog RF transmit signal for that channel that is output via a respective transmit port 114 of the DPD RF transceiver integrated circuit 100. The digitally pre-distorted analog RF transmit signal is supplied to a respective power amplifier 208. This digitally pre-distorted analog RF transmit signal for each channel is also referred to here as the "second analog RF transmit signal" and is a digitally pre-distorted version of the first analog transmit RF signal generated and output by the non-DPD RF transceiver 202 for that channel.

For each channel, the baseband processing module 106 in the DPD RF transceiver integrated circuit 100 processes the baseband data supplied on the transmit JESD204B interface 104. Specifically, in the embodiment shown in FIG. 2, the baseband processing module 106 implements a DPD function 108 and CFR function 110 that processes the baseband data supplied on the transmit JESD204B interface 104 for each channel by performing DPD and CFR, respectively, on that baseband data. (As noted above, the baseband processing module 106 can also implement other types of processing for the transmit signal path of each channel such as an iFFT 107 and/or DUC 109). The resulting processed (digitally pre-distorted) baseband data for each channel is output to a respective digital-to-analog conversion (DAC) module 112. Each digital-to-analog conversion module 112 is configured to convert the processed (digitally pre-distorted) baseband data to an analog signal, upconvert the analog signal to the desired RF frequency, filter the upconverted RF signal, and output the filtered RF signal on a respective transmit (TX) port 114 of the DPD RF transceiver integrated circuit 100.

A respective external RF coupler 210 is coupled to the output of each power amplifier 208. Each RF coupler 210 outputs a coupled signal that is a version of the analog RF output signal output by the associated power amplifier 208. The coupled signal output by each RF coupler 210 is received by the DPD RF transceiver integrated circuit 100 via a respective observation receive (OBS) port 122 and converted to digital baseband data (by the observation analog-to-digital conversion (ADC) module 124 associated with that observation receive port 122). The baseband data for each received coupled signal is used by the DPD function 108 in the baseband processing module 106 to update the inverse model used in performing DPD for that power amplifier 208. As noted above, the inverse model is updated based on a real-time comparison of the corresponding power amplifier's input and output signals. Coefficients used to implement the inverse model of the nonlinear transfer characteristics of that power amplifier 208 are updated based on the difference between the pre-distorted digital version of the transmit signal (which, after conversion to an analog signal, is input to the corresponding power amplifier 208) and the digital coupled signal (which is a version of the output of the corresponding power amplifier 208).

By using the DPD RF transceiver integrated circuit 100 in this way, the power-efficient ASIC technology used to implement the DPD functionality 108 in the DPD RF transceiver integrated circuit 100 can be leveraged in order to digitally pre-distort analog transmit signals output by an RF transceiver circuit 202 that does not include DPD functionality. This enables DPD to be performed for such a non-DPD RF transceiver circuit 202 (and the analog transmit signals output thereby) in a convenient, cost-effective, and efficient manner.

Figure 3:
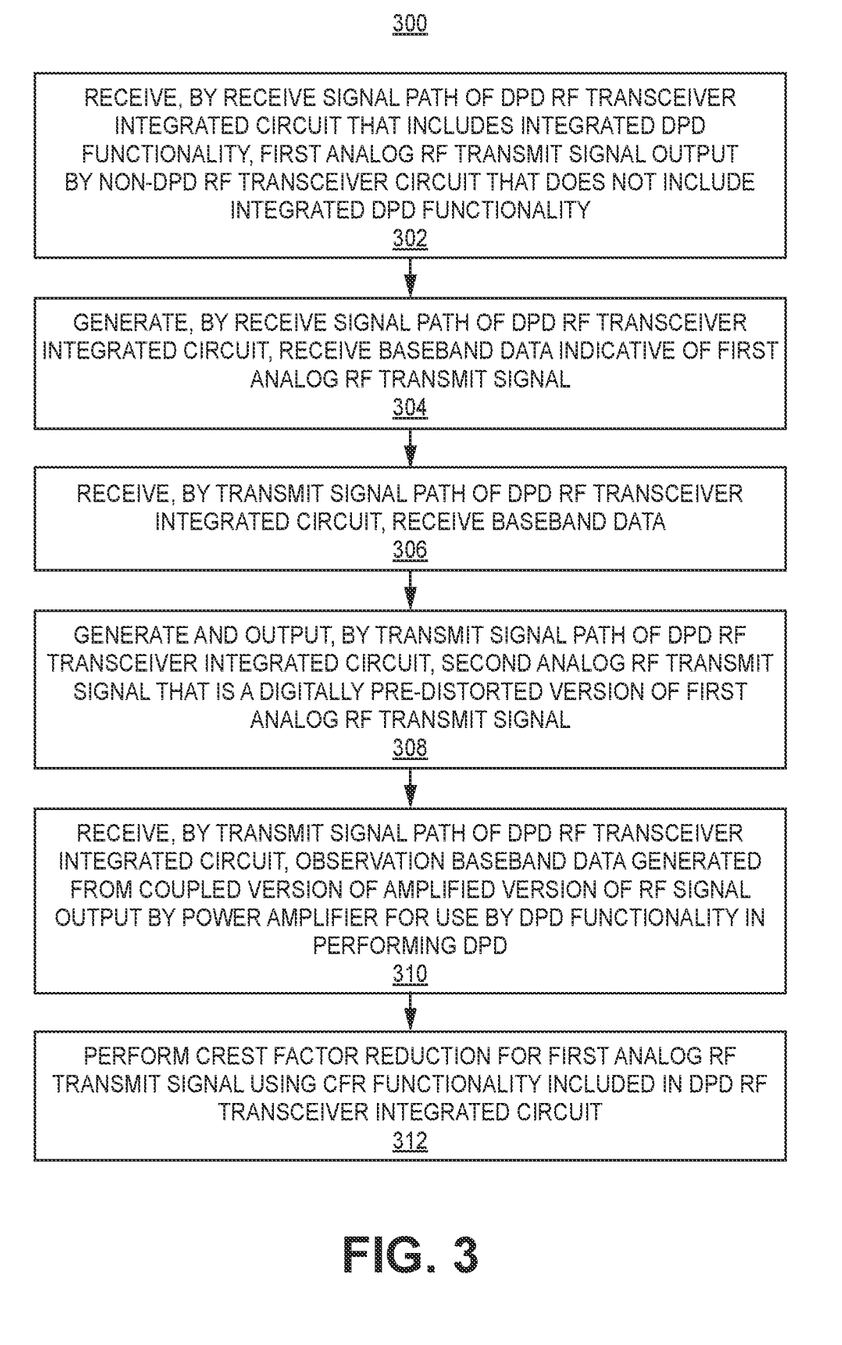
FIG. 3 comprises a high-level flowchart illustrating one exemplary embodiment of a method of performing digital pre-distortion for a first analog RF transmit signal and a power amplifier.

FIG. 3 comprises a high-level flowchart illustrating one exemplary embodiment of a method 300 of performing digital pre-distortion (DPD) for a first analog radio frequency (RF) transmit signal and a power amplifier. The embodiment of method 300 shown in FIG. 3 is described here as being implemented using the DPD RF transceiver integrated circuit 100 and the system 200 shown in FIG. 2 (though other embodiments can be implemented in other ways).

The blocks of the flow diagram shown in FIG. 3 have been arranged in a generally sequential manner for ease of explanation; however, it is to be understood that this arrangement is merely exemplary, and it should be recognized that the processing associated with method 300 (and the blocks shown in FIG. 3) can occur in a different order (for example, where at least some of the processing associated with the blocks is performed in parallel and/or in an event-driven manner). Also, most standard exception handling is not described for ease of explanation; however, it is to be understood that method 300 can and typically would include such exception handling.

Method 300 comprises receiving, by a receive signal path 105 of a DPD RF transceiver integrated circuit 100 that includes integrated DPD functionality 108, the first analog RF transmit signal output by a non-DPD RF transceiver circuit 202 that does not include DPD functionality (block 302). In this embodiment, the transmit signal path 204 in the non-DPD RF transceiver 202 generates a respective first analog transmit RF signal that would otherwise be supplied directly to a respective power amplifier 208 and, instead of supplying it directly to the respective power amplifier 208, supplies the first analog transmit RF signal for each channel to the DPD RF transceiver integrated circuit 100 on a respective one of the receive ports 120.

Method 300 further comprises generating, by the DPD RF transceiver integrated circuit 100, receive baseband data indicative of the first analog RF transmit signal (block 304). In this embodiment, for each channel, the first analog transmit RF signal generated and output by the non-DPD RF transceiver 202 for that channel is converted to baseband data by a respective analog-to-digital conversion module 118 included in the DPD RF transceiver integrated circuit 100.

Method 300 further comprises receiving the receive baseband data by a transmit signal path 105 of the DPD RF transceiver integrated circuit 100 (block 306). In this embodiment, instead of being provided to an external processing device as described above in connection with FIG. 1, the baseband data that is generated in each channel of the receive signal path 105 of the DPD RF transceiver integrated circuit 100 (from the first analog transmit RF signal generated and output by the non-DPD RF transceiver 202 for that channel) is provided to the transmit signal path 103 of that same DPD RF transceiver integrated circuit 100 via the transmit JESD204B interface 104. As noted above, this can be done by coupling the receive JESD204B interface 104 to the transmit JESD204B interface 104 (for example, using an appropriate cable or traces on a circuit board) so that the baseband data output on the receive JESD204B interface 104 for each channel is received on the transmit JESD204B interface 104 of that same DPD RF transceiver integrated circuit 100. Alternatively, this can be done by looping back the baseband data generated in each channel of the receive signal path 105 of the DPD RF transceiver integrated circuit 100 to the transmit signal path 103 of that same DPD RF transceiver integrated circuit 100 entirely within the DPD RF transceiver integrated circuit 100.

Method 300 further comprises generating and outputting, by the transmit signal path 105, a second analog RF transmit signal generated from the transmit baseband data, wherein the second analog RF transmit signal output by the transmit signal path 105 is a digitally pre-distorted version of the first analog RF transmit signal for amplification by the power amplifier 208 (block 308).

In this embodiment, for each channel, the transmit signal path 103 of that DPD RF transceiver integrated circuit 100 uses the provided baseband data to generate a second analog RF transmit signal for that channel that is a digitally pre-distorted version of the first analog RF transmit signal. The second analog RF transmit signal is output via a respective transmit port 114 of the DPD RF transceiver integrated circuit 100 and supplied to a respective power amplifier 208. The DPD functionality 108 integrated into the DPD RF transceiver integrated circuit 100 performs the DPD processing for each channel in order to generate the second analog RF transmit signal for each channel.

Method 300 further comprises receiving, by the transmit signal path 105, observation baseband data generated from a coupled version of an amplified analog RF signal output by the power amplifier 208, wherein the DPD functionality 108 uses the observation baseband data in performing DPD (block 310). In this embodiment, the coupled signal output by each RF coupler 210 is received by the DPD RF transceiver integrated circuit 100 via a respective observation receive port 122 and converted to digital baseband data. The baseband data for each received coupled signal is used by the DPD function 108 in the baseband processing module 106 to update the inverse model used in performing DPD for that power amplifier 208. Alternatively, the coupled signal output by each RF coupler 210 can be received by the DPD RF transceiver integrated circuit 100 using a shared OBS receiver architecture as described above.

Method 300 further comprises performing crest factor reduction (CFR) for the first analog RF transmit signal using CFR functionality 110 included in the DPD RF transceiver integrated circuit 100 (block 312). In this embodiment, this is done by the CFR function 110 included in the DPD RF transceiver integrated circuit 100. (As noted above, other types of processing can also be implemented).

The technique described above in connection with FIGS. 2 and 3 are well-suited for use in repeater systems (such as single-node repeaters and distributed antenna systems). It is to be understood, however, that this technique can be used in other applications.

Figure 4:
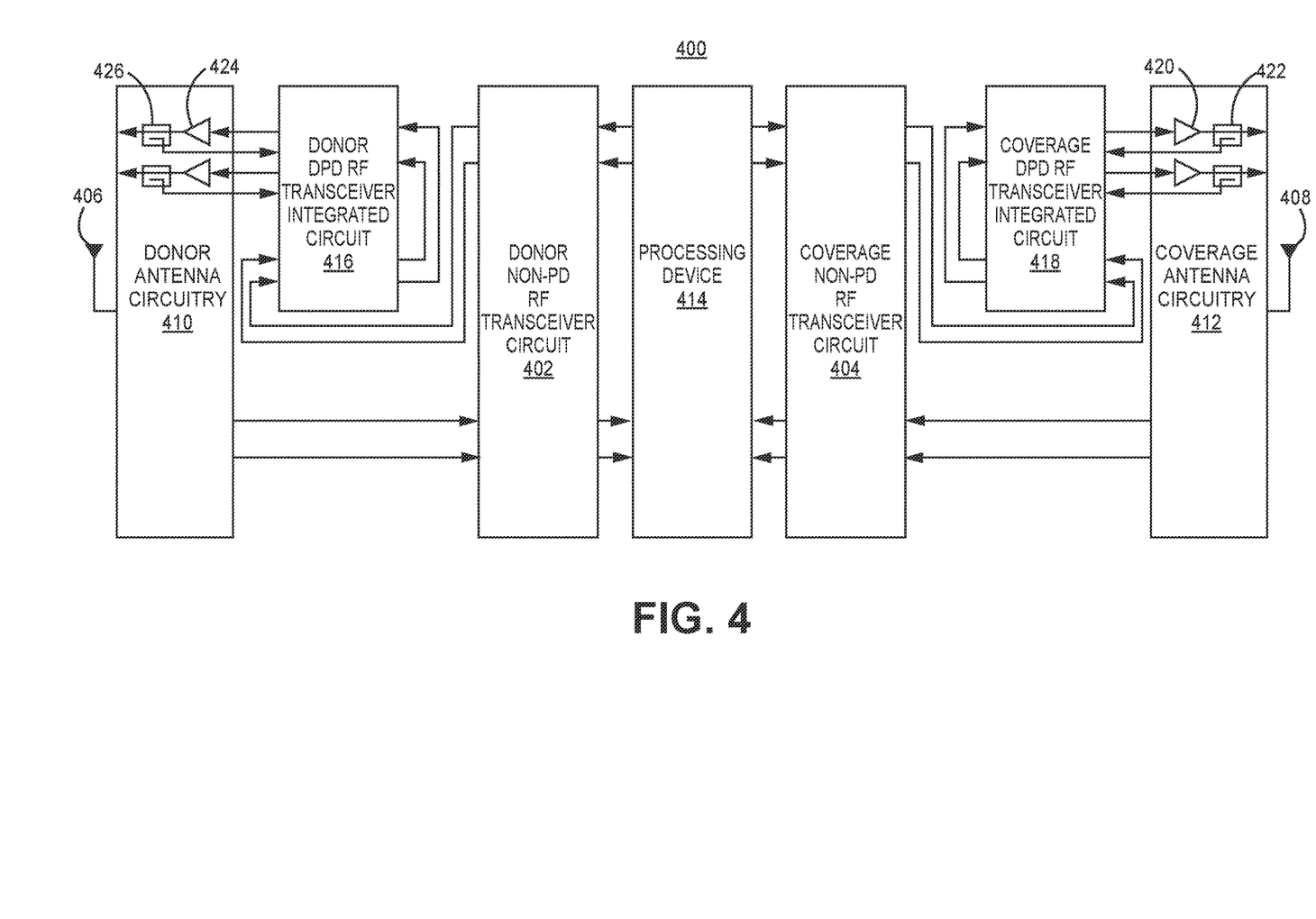
FIG. 4 is a block diagram illustrating one exemplary embodiment of a repeater system in which RF transceiver integrated circuits that have integrated DPD functionality are used with RF transceivers that do not include DPD functionality in order to implement DPD functionality for the other RF transceivers.

FIG. 4 is a block diagram illustrating one exemplary embodiment of a repeater system 400 in which RF transceiver integrated circuits that have integrated DPD functionality are used with RF transceivers that do not include DPD functionality in order to implement DPD functionality for the other RF transceivers. In the exemplary embodiment shown in FIG. 4, the repeater system 400 comprises a single-node repeater and is also referred to here as single-node repeater 400. It is to be understood, however, that the repeater system 400 can be implemented in other ways. For example, as described below in connection with FIGS. 5A and 5B, the repeater system can also be implemented as a distributed antenna system (DAS).

In the exemplary embodiment shown in FIG. 4, the single-node repeater 400 is configured to repeat two bidirectional RF bands or channels. It is to be understood, however, that the single-node repeater 400 can be configured to repeat a different number of RF bands or channels. In the exemplary embodiment shown in FIG. 4, the single-node repeater 400 comprises two dual-channel RF transceivers 402 and 404 that do not include DPD functionality. One non-DPD RF transceiver 402 is used to send and receive analog RF signals to and from two base stations (not shown) via at least one donor antenna 406 and is referred to here as the "donor" non-DPD RF transceiver 402. The other non-DPD RF transceiver 404 is used to send and receive RF signals to and from user equipment (UE) (not shown) via one or more coverage antennas 408 and is referred to here as the "coverage" non-DPD RF transceiver 404. The donor antenna 406 and coverage antenna 408 are coupled to the donor and coverage non-DPD RF transceivers 402 and 404, respectively, via respective antenna circuitry 410 and 412 that includes one or more duplexers, filters, splitters, combiners, hybrids, low noise amplifiers, etc., some of which are not shown for ease of illustration.

The single-node repeater 400 also comprises a processing device 414 (such as a DSP and/or FPGA) that is coupled to the non-DPD RF transceivers 402 and 404. As noted above, the donor and coverage RF transceivers 402 and 404 do not include DPD functionality. In order to easily implement DPD functionality for the donor and coverage RF transceivers 402 and 404, RF transceiver integrated circuits 416 and 418 that have integrated DPD functionality are coupled to the donor and coverage RF transceivers 402 and 404, respectively. The DPD RF transceiver integrated circuits 402 and 404 can be implemented using the RF transceiver integrated circuit 100 described above in connection with FIGS. 1 and 2.

The RF transceiver integrated circuit 416 that is coupled to the donor RF transceiver 402 is also referred to here as the "donor" DPD RF transceiver integrated circuit 416. The RF transceiver integrated circuit 418 that is coupled to the coverage RF transceiver 404 is also referred to here as the "coverage" DPD RF transceiver integrated circuit 416.

In the downlink direction, for each channel repeated by the repeater 400, an analog downlink RF signal transmitted by one of the base stations is received at the single-node repeater 400 via the donor antenna 406. The received downlink analog RF signal for each channel is provided, via the associated antenna circuitry 410, to the donor non-DPD RF transceiver 402. The donor non-DPD RF transceiver 402 is configured to produce, for each channel, downlink baseband data from the downlink analog RF received signal for that channel. The downlink baseband channel for each channel is provided to the processing device 414, which filters and digitally amplifies the downlink baseband data for each channel under software control. The filtered and digitally amplified downlink baseband data for each channel is output to the coverage non-DPD RF transceiver 404. For each repeated channel, the coverage non-DPD RF transceiver 404 generates a respective downlink analog RF signal which is provided, via a respective receive port 120 (not shown in FIG. 4), to the coverage DPD RF transceiver integrated circuit 418, which produces a digitally pre-distorted version of the downlink analog RF signal using the integrated DPD functionality 108 included in the coverage DPD RF transceiver integrated circuit 418. The digitally pre-distorted downlink analog RF signal is supplied to a respective power amplifier 420 included in the donor antenna circuitry 412. For each channel, a respective external RF coupler 422 included in the donor antenna circuitry 412 is coupled to the output of each power amplifier 420 in the donor antenna circuitry 412. Each RF coupler 422 outputs a coupled signal that is a version of the amplified downlink analog RF signal output by the associated power amplifier 420. The coupled signal output by each RF coupler 422 is received by the coverage DPD RF transceiver integrated circuit 418 via a respective observation receive port 122 (not shown in FIG. 4). For each repeated channel, the coverage DPD RF transceiver integrated circuit 418 produces the respective digitally pre-distorted version of the downlink analog RF signal from the respective downlink analog RF signal using the coupled signal for that channel as described above in connection with FIGS. 2 and 3.

In the uplink direction, for each channel repeated by the repeater 400, an analog uplink RF signal transmitted by user equipment is received at the single-node repeater 400 via the coverage antenna 408. The received uplink analog RF signal for each channel is provided, via the associated antenna circuitry 412, to the coverage non-DPD RF transceiver 404. The coverage non-DPD RF transceiver 404 is configured to produce, for each channel, uplink baseband data from the uplink analog RF receive signal for that channel. The uplink baseband channel for each channel is provided to the processing device 414, which filters and digitally amplifies the uplink baseband data for each channel under software control. The filtered and digitally amplified uplink baseband data for each channel is output to the donor non-DPD RF transceiver 402. For each repeated channel, the donor non-DPD RF transceiver 402 generates a respective uplink analog RF signal, which is provided, via a respective receive port 120 (not shown in FIG. 4), to the donor DPD RF transceiver integrated circuit 416, which produces a digitally pre-distorted version of the uplink analog RF signal. The digitally pre-distorted uplink analog RF signal is supplied to a respective power amplifier 424 included in the respective antenna circuitry 410. For each channel, a respective external RF coupler 426 is coupled to the output of each power amplifier 424 in the antenna circuitry 410. Each RF coupler 426 outputs a coupled signal that is a version of the amplified uplink analog RF signal output by the associated power amplifier 424. The coupled signal output by each RF coupler 426 is received by the donor DPD RF transceiver integrated circuit 416 via a respective observation receive port 122 (not shown in FIG. 4). For each repeated channel, the donor DPD RF transceiver integrated circuit 416 produces the respective digitally pre-distorted version of the uplink analog RF signal from the respective uplink analog RF signal using the coupled signal for that channel as described above in connection with FIGS. 2 and 3.

The technique described above in connection with FIGS. 2 and 3 are also well-suited for use in other types of repeater systems such as distributed antenna systems.

Figure 5A:
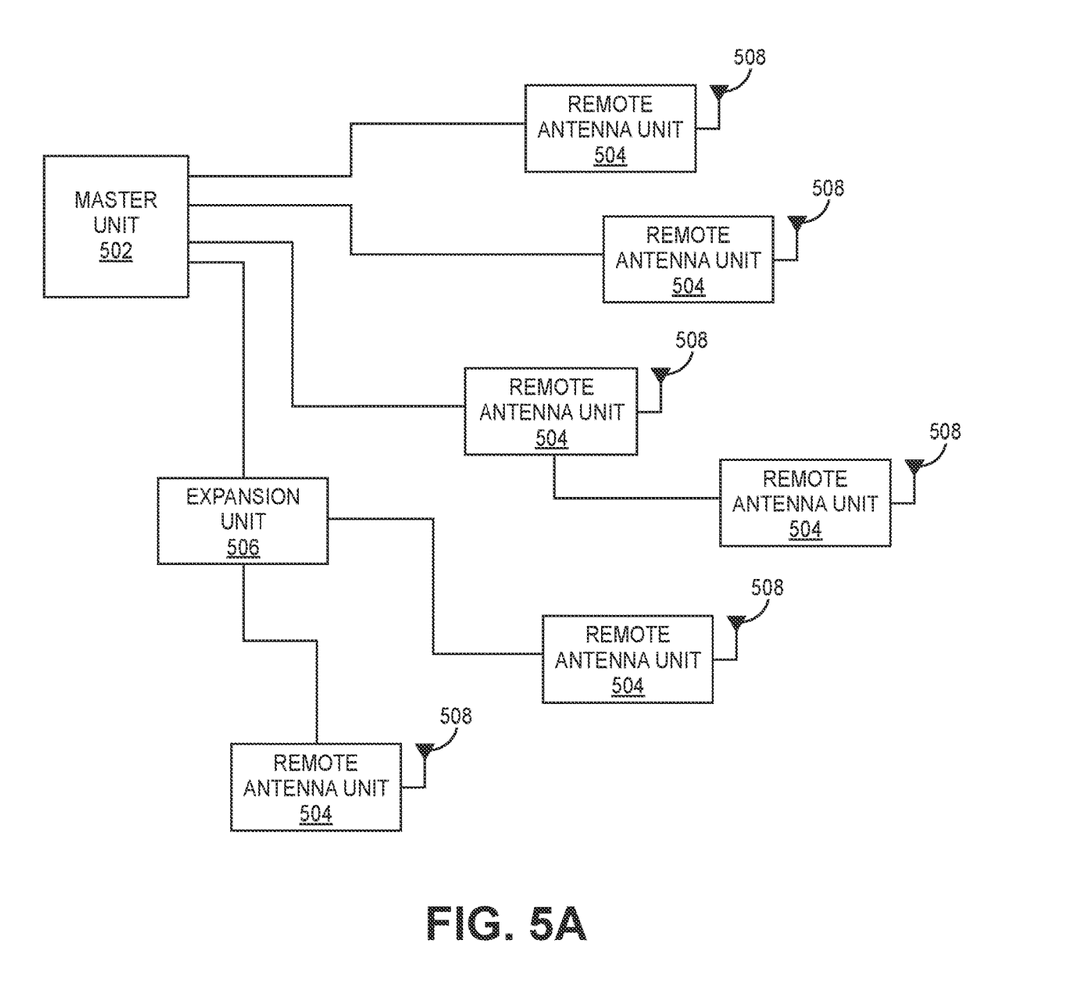
FIG. 5A is a block diagram illustrating another exemplary embodiment of a repeater system in which RF transceiver integrated circuits that have integrated DPD functionality are used with RF transceivers that do not include DPD functionality in order to implement DPD functionality for the other RF transceivers.

FIG. 5A is a block diagram illustrating another exemplary embodiment of a repeater system 500 in which RF transceiver integrated circuits that have integrated DPD functionality are used with RF transceivers that do not include DPD functionality in order to implement DPD functionality for the other RF transceivers. In the exemplary embodiment shown in FIG. 5A, the repeater system 500 comprises a distributed antenna system and is also referred to here as "distributed antenna system" 500 or "DAS" 500.

The DAS 500 typically includes one or more master units 502 that are communicatively coupled to a plurality of remote antenna units 504, where each remote antenna unit 504 can be coupled directly to one or more of the master units 502 or indirectly via one or more other remote antenna units 504 and/or via one or more intermediary or expansion units 506. A DAS 500 is typically used to improve the coverage provided by one or more base stations (not shown) that are coupled to the master units 502. These base stations can be coupled to the master units 502 via one or more cables or via a wireless connection, for example, using one or more donor antennas. The wireless service provided by the base stations can include commercial cellular service and/or private or public safety wireless communications.

In general, each master unit 502 receives one or more downlink signals from one or more base stations and generates one or more downlink transport signals derived from one or more of the received downlink base station signals. Each master unit 502 transmits one or more downlink transport signals to one or more of the remote antenna units 504 (either directly or indirectly via one or more other remote antenna units 504 and/or via one or more intermediary or expansion units 506). Each remote antenna unit 504 receives the downlink transport signals transmitted to it from one or more master units 502 and uses the received downlink transport signals to generate one or more downlink radio frequency signals that are radiated from one or more coverage antennas 508 associated with that remote antenna unit 504. The downlink radio frequency signals are radiated for reception by user equipment (UE) (not shown). Typically, this involves, among other things, simulcasting downlink signals received from each base station from multiple remote antenna units 504. In this way, the DAS 500 increases the coverage area for the downlink capacity provided by the base stations.

Likewise, each remote antenna unit 504 receives one or more uplink radio frequency signals transmitted from the user equipment. Each remote antenna unit 504 generates one or more uplink transport signals derived from the one or more uplink radio frequency signals and transmits them to one or more of the master units 502 (either directly or indirectly via one or more other remote antenna units 504 and/or via one or more intermediary or expansion units 506). Each master unit 502 receives the respective uplink transport signals transmitted to it from one or more remote antenna units 504 and uses the received uplink transport signals to generate one or more uplink base station radio frequency signals that are provided to the one or more base stations associated with that master unit 502. Typically, this involves, among other things, combining or summing uplink signals received from multiple remote antenna units 504 in order to produce the base station signal provided to each base station. In this way, the DAS 500 increases the coverage area for the uplink capacity provided by the base stations.

The DAS 500 can use either digital transport, analog transport, or combinations of digital and analog transport for generating and communicating the transport signals between the master units 502, the remote antenna units 504, and any expansion units 506.

In the exemplary embodiment shown in FIG. 5A, the DAS 500 is configured to distribute two bidirectional RF bands or channels. It is to be understood, however, that the DAS 500 can be configured to distribute a different number of RF bands or channels.

Figure 5B:
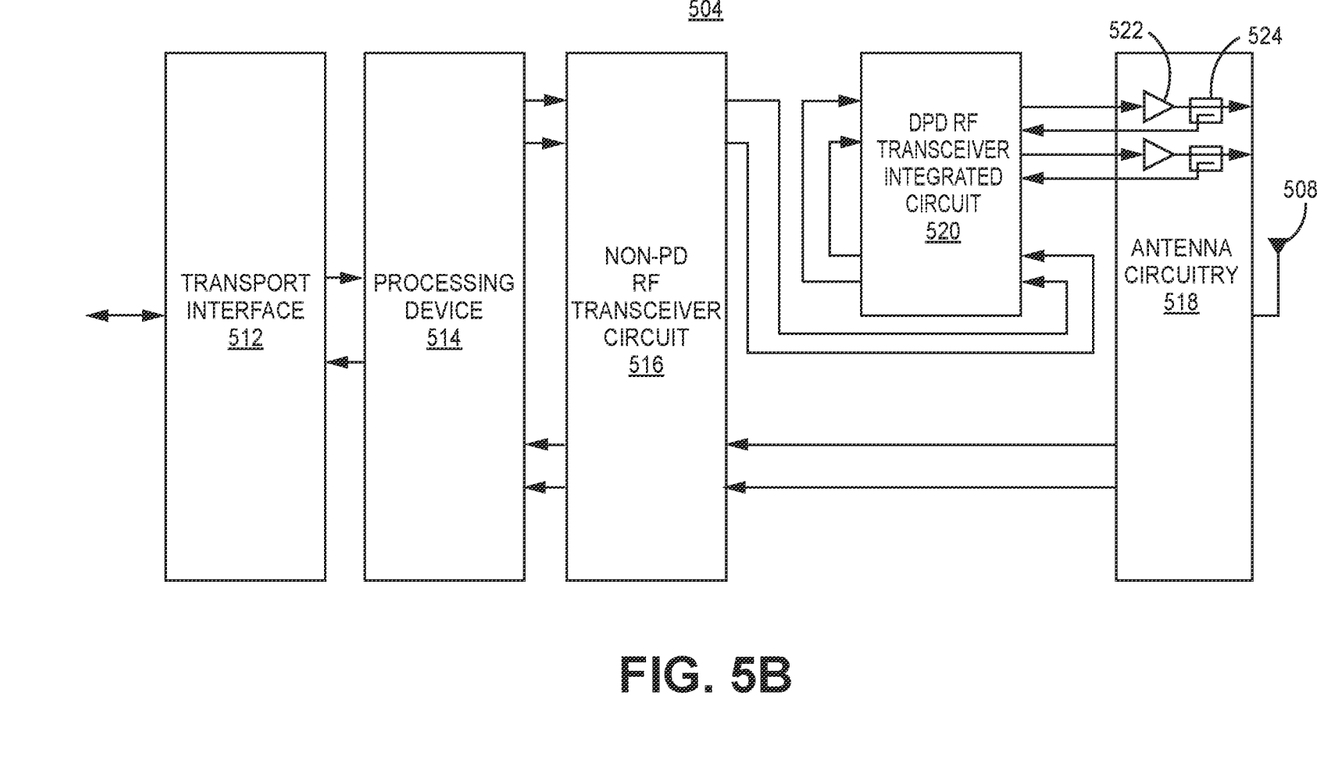
FIG. 5B illustrates one example of a remote antenna unit that is suitable for use in the DAS of the type described above in connection with FIG. 5A.

FIG. 5B illustrates one example of a remote antenna unit 504 that is suitable for use in the DAS 500 of the type described above in connection with FIG. 5A. In the embodiment shown in FIG. 5B, the remote antenna unit 504 is configured for use in a DAS 500 that uses digital transport for communicating with the remote antenna unit 504. The remote antenna unit 504 comprises a transport interface 512 for receiving and transmitting downlink and uplink transport signals from an upstream node (for example, a master unit 502, other remote antenna unit 504, or expansion unit 506) using digital transport. The remote antenna unit 504 also comprises a processing device 514 (such as a DSP and/or FPGA) that is coupled to the transport interface 512.

In the exemplary embodiment shown in FIG. 5B, the remote antenna unit 504 also comprises a dual-channel RF transceiver 516 that is coupled to the processing device 514. The RF transceiver 516 does not include DPD functionality. The non-DPD RF transceiver 516 is used to send and receive RF signals to and from the user equipment via at least one coverage antenna 508. The coverage antenna 508 is coupled to the non-DPD RF transceivers 516 via respective antenna circuitry 518 that includes one or more duplexers, filters, splitters, combiners, hybrids, low noise amplifiers, etc., some of which are not shown for ease of illustration.

In order to easily implement DPD functionality for the RF transceiver 516 and the remote antenna unit 504, an RF transceiver integrated circuit 520 that has integrated DPD functionality is coupled to the non-DPD RF transceiver 516 in the manner described above in connection with FIGS. 2 and 3. The DPD RF transceiver integrated circuit 520 can be implemented using the RF transceiver integrated circuit 100 described above in connection with FIGS. 1 and 2.

In the downlink direction, the transport interface 512 of the remote antenna unit 504 receives the downlink transport signals transmitted to it from one or more master units 502 (either directly or indirectly via one or more other remote antenna units 504 and/or via one or more intermediary or expansion units 506). The transport interface 512 extracts the downlink digital data communicated to the remote antenna unit 504 (which includes digital downlink baseband data for the two channels distributed by that remote antenna unit 504). The downlink digital data is provided to the processing device 514, which filters and digitally amplifies the downlink baseband data for each channel under software control. The filtered and digitally amplified downlink baseband data for each channel is output to the non-DPD RF transceiver 516. For each repeated channel, the non-DPD RF transceiver 516 generates a respective downlink analog RF signal which is provided, via a respective receive port 120 (not shown in FIG. 5B), to the DPD RF transceiver integrated circuit 520, which produces a digitally pre-distorted version of the downlink analog RF signal. The digitally pre-distorted downlink analog RF signal is supplied to a respective power amplifier 522 included in the respective antenna circuitry 518. For each channel, a respective external RF coupler 524 is coupled to the output of each power amplifier 522 in the antenna circuitry 518. Each RF coupler 524 outputs a coupled signal that is a version of the amplified downlink analog RF signal output by the associated power amplifier 522. The coupled signal output by each RF coupler 524 is received by the DPD RF transceiver integrated circuit 520 via a respective observation receive port 122 (not shown in FIG. 5B). For each repeated channel, the DPD RF transceiver integrated circuit 520 produces the respective digitally pre-distorted version of the downlink analog RF signal from the respective downlink analog RF signal using the coupled signal for that channel as described above in connection with FIGS. 2 and 3.

The DPD technique described above in connection with FIGS. 2 and 3 can be used in other types of single-node repeaters and distributed antenna systems. For example, although the single-node repeater 400 shown in FIG. 4 is a digital single-node repeater, it is to be understood that the DPD technique described above in connection with FIGS. 2 and 3 can be used in analog single-node repeaters. Also, although the DAS 500 shown in FIGS. 5A and 5B, it is to be understood that the DPD technique described above in connection with FIGS. 2 and 3 can be used in analog distributed antenna systems and the remote antenna units configured for use therein.

This DPD technique can be used in other applications such as base stations or relay nodes that communicate using licensed radio frequency spectrum (for example, base stations or relay nodes that support one or more of the Fourth Generation (4G) Long Term Evolution (LTE) Fifth Generation (5G) protocols, specifications, and standards promulgated by the 3rd Generation Partnership Project (3GPP)). This DPD technique can also be used in an "analog" power amplifier (that is, a power amplifier that is configured to receive an analog transmit RF signal for amplification).

The methods and techniques described here may be implemented in digital electronic circuitry, or with a programmable processor (for example, a special-purpose processor or a general-purpose processor such as a computer) firmware, software, or in combinations of them. Apparatus embodying these techniques may include appropriate input and output devices, a programmable processor, and a storage medium tangibly embodying program instructions for execution by the programmable processor. A process embodying these techniques may be performed by a programmable processor executing a program of instructions to perform desired functions by operating on input data and generating appropriate output. The techniques may advantageously be implemented in one or more programs that are executable on a programmable system including at least one programmable processor coupled to receive data and instructions from, and to transmit data and instructions to, a data storage system, at least one input device, and at least one output device. Generally, a processor will receive instructions and data from a read-only memory and/or a random-access memory. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and DVD disks. Any of the foregoing may be supplemented by, or incorporated in, specially-designed application-specific integrated circuits (ASICs).

A number of embodiments of the invention defined by the following claims have been described. Nevertheless, it will be understood that various modifications to the described embodiments may be made without departing from the spirit and scope of the claimed invention. Accordingly, other embodiments are within the scope of the following claims.

EXAMPLE EMBODIMENTS

Example 1 includes a system for performing digital pre-distortion (DPD) for a first analog radio frequency (RF) transmit signal and a power amplifier, the system comprising: a non-DPD RF transceiver circuit that does not include DPD functionality, the non-DPD RF transceiver circuit configured to output the first analog RF transmit signal; and a DPD RF transceiver integrated circuit comprising: a transmit signal path configured to output a second analog RF transmit signal generated from transmit baseband data input to the transmit signal path, wherein the transmit signal patch comprises integrated DPD functionality; and a receive signal path configured to output receive baseband data generated from an analog RF receive signal input to the receive signal path; wherein the system is configured so that the first analog RF transmit signal output by the non-DPD RF transceiver circuit is received by the receive signal path of the DPD RF transceiver integrated circuit so that the receive baseband data generated by the receive signal path is indicative of the first analog RF transmit signal; and wherein the system is configured so that the receive baseband data generated by the DPD RF transceiver integrated circuit is received by the transmit signal path of the DPD RF transceiver integrated circuit, wherein the second analog RF transmit signal output by the transmit signal path is a digitally pre-distorted version of the first analog RF transmit signal for amplification by the power amplifier.

Example 2 includes the system of Example 1, wherein the DPD functionality uses observation baseband data generated from a coupled version of an amplified analog RF signal output by the power amplifier that is received by the transmit signal path.

Example 3 includes the system of Example 2, wherein the coupled version of the amplified analog RF signal output by the power amplifier is input to the transmit signal path via an RF coupler coupled to an output of the power amplifier.

Example 4 includes the system of any of Examples 1-2, wherein the non-DPD RF transceiver circuit comprises a digital transceiver circuit that generates the first analog RF transmit signal from digital baseband input data.

Example 5 includes the system of any of Examples 1-4, wherein the non-DPD RF transceiver circuit comprises an analog RF transceiver circuit that generates the first analog RF transmit signal from an analog input signal.

Example 6 includes the system of any of Examples 1-5, wherein the DPD RF transceiver integrated circuit further comprising: an analog receive port coupled to the receive signal path; a receive serial interface coupled to the receive signal path; a transmit serial interface coupled to the transmit signal path; an analog transmit port coupled to the transmit signal path; and an observation port coupled to the transmit signal path; wherein the analog RF transmit signal is coupled to the analog RF receive port so that the analog RF transmit signal is received on the analog RF receive port of the DPD RF transceiver integrated circuit and so that receive baseband data output via the receive serial interface is indicative of the analog RF transmit signal; and wherein the receive serial interface is coupled to the transmit serial interface so that the DPD functionality performs DPD on the receive baseband data using observation baseband data generated from a coupled version of an amplified analog RF signal output by the power amplifier that is received via the observation port and so that a digitally pre-distorted version of the analog RF transmit signal is output on the analog transit port for amplification by the power amplifier.

Example 7 includes the system of any of Examples 1-6, wherein the system is configured so that the receive baseband data generated by the DPD RF transceiver integrated circuit is received by the transmit signal path of the DPD RF transceiver integrated circuit by looping back the receive baseband data generated by the DPD RF transceiver integrated circuit to the transmit signal path of the DPD RF transceiver integrated circuit within the DPD RF transceiver integrated circuit.

Example 8 includes the system of any of Examples 1-7, wherein the system comprises the power amplifier.

Example 9 includes the system of any of Examples 1-8, wherein the DPD RF transceiver integrated circuit further includes at least one of: crest factor reduction (CFR) functionality; inverse fast Fourier transform (iFFT) functionality; digital up conversion (DUC) functionality; digital down conversion (DDC) functionality; and fast Fourier transform (FFT) functionality.

Example 10 includes the system of any of Examples 1-9, wherein the DPD RF transceiver integrated circuit comprises a dual-channel DPD RF transceiver integrated circuit.

Example 11 includes the system of any of Examples 1-10, wherein the system comprises at least one of a repeater system, a base station, and a relay node.

Example 12 includes the system of any of Examples 1-11, wherein the system comprises a distributed antenna system (DAS).

Example 13 includes the system of Example 12, wherein the DAS comprises at least one of a digital DAS and an analog DAS.

Example 14 includes the system of any of Examples 12-13, wherein the DAS comprises at least one remote antenna unit, wherein the at least one remote antenna unit comprises the non-DPD RF transceiver circuit and the DPD RF transceiver integrated circuit.

Example 15 includes the system of any of Examples 1-14, wherein the system comprises a single-node repeater.

Example 16 includes the system of Example 15, wherein the single-node repeater comprises at least one of an analog single-node repeater and a digital single-node repeater.

Example 17 includes the system of any of Examples 15-16, wherein the non-DPD RF transceiver circuit comprises a donor non-DPD RF transceiver circuit and a coverage non-DPD RF transceiver circuit configured to output a first donor analog RF transmit signal and a first coverage analog RF transmit signal, respectively, the donor non-DPD RF transceiver circuit and the coverage non-DPD RF transceiver circuit not including DPD functionality; wherein the DPD RF transceiver integrated circuit comprises a coverage DPD RF transceiver integrated circuit and a donor DPD RF transceiver integrated circuit, each of which comprises a respective transmit signal path and a respective receive signal path; wherein the power amplifier comprises a donor power amplifier and a coverage power amplifier; wherein the single-node repeater is configured so that the first donor analog RF transmit signal output by the donor non-DPD RF transceiver circuit is received by the receive signal path of the donor DPD RF transceiver integrated circuit so that the receive baseband data generated by the receive signal path of the donor DPD RF transceiver integrated circuit is indicative of the donor analog RF transmit signal; and wherein the single-node repeater is configured so that the receive baseband data generated by the donor DPD RF transceiver integrated circuit is received by the transmit signal path of the donor DPD RF transceiver integrated circuit, wherein the second donor analog RF transmit signal output by the transmit signal path of the donor DPD RF transceiver integrated circuit is a digitally pre-distorted version of the first analog RF transmit signal for amplification by the donor power amplifier; wherein the single-node repeater is configured so that the first coverage analog RF transmit signal output by the coverage non-DPD RF transceiver circuit is received by the receive signal path of the coverage DPD RF transceiver integrated circuit so that the receive baseband data generated by the receive signal path of the coverage DPD RF transceiver integrated circuit is indicative of the coverage analog RF transmit signal; and wherein the single-node repeater is configured so that the receive baseband data generated by the coverage DPD RF transceiver integrated circuit is received by the transmit signal path of the coverage DPD RF transceiver integrated circuit, wherein the second coverage analog RF transmit signal output by the transmit signal path of the coverage DPD RF transceiver integrated circuit is a digitally pre-distorted version of the first analog RF transmit signal for amplification by the coverage power amplifier.

Example 18 includes a method of performing digital pre-distortion (DPD) for a first analog radio frequency (RF) transmit signal and a power amplifier, the method comprising: receiving, by a receive signal path of a DPD RF transceiver integrated circuit that includes integrated DPD functionality, the first analog RF transmit signal output by a non-DPD RF transceiver circuit that does not include DPD functionality; generating, by the DPD RF transceiver integrated circuit, receive baseband data indicative of the first analog RF transmit signal; receiving the receive baseband data by a transmit signal path of the DPD RF transceiver integrated circuit; and generating and outputting, by the transmit signal path, a second analog RF transmit signal generated from the transmit baseband data, wherein the second analog RF transmit signal output by the transmit signal path is a digitally pre-distorted version of the first analog RF transmit signal for amplification by the power amplifier.

Example 19 includes the method of Example 18, further comprising: receiving, by the transmit signal path, observation baseband data generated from a coupled version of an amplified analog RF signal output by the power amplifier, wherein the observation baseband data is used in performing DPD.

Example 20 includes the method of any of Examples 18-19, further comprising: performing crest factor reduction (CFR) for the first analog RF transmit signal using CFR functionality included in the DPD RF transceiver integrated circuit.

Example 21 includes the method of any of Examples 18-20, wherein the method is performed in at least one of a repeater system, a base station, a relay node, and an analog power amplifier.

Example 22 includes the method of any of Examples 18-21, wherein receiving the receive baseband data by the transmit signal path of the DPD RF transceiver integrated circuit comprises: outputting the receive baseband from the receive signal path of the DPD RF transceiver integrated circuit on a receive serial interface coupled to the receive signal path; and receiving the receive baseband data by the transmit signal path of the DPD RF transceiver integrated circuit on a transmit serial interface coupled to the transmit signal path.

Example 23 includes the method of any of Examples 18-22, wherein receiving the receive baseband data by the transmit signal path of the DPD RF transceiver integrated circuit comprises: looping back the receive baseband data generated by the DPD RF transceiver integrated circuit to the transmit signal path of the DPD RF transceiver integrated circuit within the DPD RF transceiver integrated circuit.

Example 24 includes the method of any of Examples 18-23, wherein the DPD RF transceiver integrated circuit comprises a baseband processing module that is configured to implement at least one of: digital pre-distortion (DPD) functionality; crest factor reduction (CFR) functionality; inverse fast Fourier transform (iFFT) functionality; digital up conversion (DUC) functionality; digital down conversion (DDC) functionality; and fast Fourier transform (FFT) functionality.

What is claimed is:

1. A system for performing digital pre-distortion (DPD) for a first analog radio frequency (RF) transmit signal and a power amplifier, the system comprising:
  a non-DPD RF transceiver circuit that does not include DPD functionality, the non-DPD RF transceiver circuit configured to output the first analog RF transmit signal; and
  a DPD RF transceiver integrated circuit comprising:
    a transmit signal path configured to output a second analog RF transmit signal generated from transmit baseband data input to the transmit signal path, wherein the transmit signal patch comprises integrated DPD functionality; and
    a receive signal path configured to output receive baseband data generated from an analog RF receive signal input to the receive signal path;
  wherein the system is configured so that the first analog RF transmit signal output by the non-DPD RF transceiver circuit is received by the receive signal path of the DPD RF transceiver integrated circuit so that the receive baseband data generated by the receive signal path is indicative of the first analog RF transmit signal; and
  wherein the system is configured so that the receive baseband data generated by the DPD RF transceiver integrated circuit is received by the transmit signal path of the DPD RF transceiver integrated circuit, wherein the second analog RF transmit signal output by the transmit signal path is a digitally pre-distorted version of the first analog RF transmit signal for amplification by the power amplifier.

2. The system of claim 1, wherein the DPD functionality uses observation baseband data generated from a coupled version of an amplified analog RF signal output by the power amplifier that is received by the transmit signal path.

3. The system of claim 2, wherein the coupled version of the amplified analog RF signal output by the power amplifier is input to the transmit signal path via an RF coupler coupled to an output of the power amplifier.

4. The system of claim 1, wherein the non-DPD RF transceiver circuit comprises a digital transceiver circuit that generates the first analog RF transmit signal from digital baseband input data.

5. The system of claim 1, wherein the non-DPD RF transceiver circuit comprises an analog RF transceiver circuit that generates the first analog RF transmit signal from an analog input signal.

6. The system of claim 1, wherein the DPD RF transceiver integrated circuit further comprising:
- an analog receive port coupled to the receive signal path;
- a receive serial interface coupled to the receive signal path;
- a transmit serial interface coupled to the transmit signal path;
- an analog transmit port coupled to the transmit signal path; and
- an observation port coupled to the transmit signal path;
- wherein the analog RF transmit signal is coupled to the analog RF receive port so that the analog RF transmit signal is received on the analog RF receive port of the DPD RF transceiver integrated circuit and so that receive baseband data output via the receive serial interface is indicative of the analog RF transmit signal; and
- wherein the receive serial interface is coupled to the transmit serial interface so that the DPD functionality performs DPD on the receive baseband data using observation baseband data generated from a coupled version of an amplified analog RF signal output by the power amplifier that is received via the observation port and so that a digitally pre-distorted version of the analog RF transmit signal is output on the analog transit port for amplification by the power amplifier.

7. The system of claim 1, wherein the system is configured so that the receive baseband data generated by the DPD RF transceiver integrated circuit is received by the transmit signal path of the DPD RF transceiver integrated circuit by looping back the receive baseband data generated by the DPD RF transceiver integrated circuit to the transmit signal path of the DPD RF transceiver integrated circuit within the DPD RF transceiver integrated circuit.

8. The system of claim 1, wherein the system comprises the power amplifier.

9. The system of claim 1, wherein the DPD RF transceiver integrated circuit further includes at least one of:
- crest factor reduction (CFR) functionality;
- inverse fast Fourier transform (iFFT) functionality;
- digital up conversion (DUC) functionality;
- digital down conversion (DDC) functionality; and
- fast Fourier transform (FFT) functionality.

10. The system of claim 1, wherein the DPD RF transceiver integrated circuit comprises a dual-channel DPD RF transceiver integrated circuit.

11. The system of claim 1, wherein the system comprises at least one of a repeater system, a base station, and a relay node.

12. The system of claim 1, wherein the system comprises a distributed antenna system (DAS).

13. The system of claim 12, wherein the DAS comprises at least one of a digital DAS and an analog DAS.

14. The system of claim 12, wherein the DAS comprises at least one remote antenna unit, wherein the at least one remote antenna unit comprises the non-DPD RF transceiver circuit and the DPD RF transceiver integrated circuit.

15. The system of claim 1, wherein the system comprises a single-node repeater.

16. The system of claim 15, wherein the single-node repeater comprises at least one of an analog single-node repeater and a digital single-node repeater.

17. The system of claim 15, wherein the non-DPD RF transceiver circuit comprises a donor non-DPD RF transceiver circuit and a coverage non-DPD RF transceiver circuit configured to output a first donor analog RF transmit signal and a first coverage analog RF transmit signal, respectively, the donor non-DPD RF transceiver circuit and the coverage non-DPD RF transceiver circuit not including DPD functionality;
- wherein the DPD RF transceiver integrated circuit comprises a coverage DPD RF transceiver integrated circuit and a donor DPD RF transceiver integrated circuit, each of which comprises a respective transmit signal path and a respective receive signal path;
- wherein the power amplifier comprises a donor power amplifier and a coverage power amplifier;
- wherein the single-node repeater is configured so that the first donor analog RF transmit signal output by the donor non-DPD RF transceiver circuit is received by the receive signal path of the donor DPD RF transceiver integrated circuit so that the receive baseband data generated by the receive signal path of the donor DPD RF transceiver integrated circuit is indicative of the donor analog RF transmit signal; and
- wherein the single-node repeater is configured so that the receive baseband data generated by the donor DPD RF transceiver integrated circuit is received by the transmit signal path of the donor DPD RF transceiver integrated circuit, wherein the second donor analog RF transmit signal output by the transmit signal path of the donor DPD RF transceiver integrated circuit is a digitally pre-distorted version of the first analog RF transmit signal for amplification by the donor power amplifier;
- wherein the single-node repeater is configured so that the first coverage analog RF transmit signal output by the coverage non-DPD RF transceiver circuit is received by the receive signal path of the coverage DPD RF transceiver integrated circuit so that the receive baseband data generated by the receive signal path of the coverage DPD RF transceiver integrated circuit is indicative of the coverage analog RF transmit signal; and
- wherein the single-node repeater is configured so that the receive baseband data generated by the coverage DPD RF transceiver integrated circuit is received by the transmit signal path of the coverage DPD RF transceiver integrated circuit, wherein the second coverage analog RF transmit signal output by the transmit signal path of the coverage DPD RF transceiver integrated circuit is a digitally pre-distorted version of the first analog RF transmit signal for amplification by the coverage power amplifier.

18. A method of performing digital pre-distortion (DPD) for a first analog radio frequency (RF) transmit signal and a power amplifier, the method comprising:
- receiving, by a receive signal path of a DPD RF transceiver integrated circuit that includes integrated DPD functionality, the first analog RF transmit signal output by a non-DPD RF transceiver circuit that does not include DPD functionality;
- generating, by the DPD RF transceiver integrated circuit, receive baseband data indicative of the first analog RF transmit signal;
- receiving the receive baseband data by a transmit signal path of the DPD RF transceiver integrated circuit; and
- generating and outputting, by the transmit signal path, a second analog RF transmit signal generated from the transmit baseband data, wherein the second analog RF transmit signal output by the transmit signal path is a digitally pre-distorted version of the first analog RF transmit signal for amplification by the power amplifier.

19. The method of claim 18, further comprising:
receiving, by the transmit signal path, observation baseband data generated from a coupled version of an amplified analog RF signal output by the power amplifier, wherein the observation baseband data is used in performing DPD.

20. The method of claim 18, further comprising:
performing crest factor reduction (CFR) for the first analog RF transmit signal using CFR functionality included in the DPD RF transceiver integrated circuit.

21. The method of claim 18, wherein the method is performed in at least one of a repeater system, a base station, a relay node, and an analog power amplifier.

22. The method of claim 18, wherein receiving the receive baseband data by the transmit signal path of the DPD RF transceiver integrated circuit comprises:
outputting the receive baseband from the receive signal path of the DPD RF transceiver integrated circuit on a receive serial interface coupled to the receive signal path; and
receiving the receive baseband data by the transmit signal path of the DPD RF transceiver integrated circuit on a transmit serial interface coupled to the transmit signal path.

23. The method of claim 18, wherein receiving the receive baseband data by the transmit signal path of the DPD RF transceiver integrated circuit comprises:
looping back the receive baseband data generated by the DPD RF transceiver integrated circuit to the transmit signal path of the DPD RF transceiver integrated circuit within the DPD RF transceiver integrated circuit.

24. The method of claim 18, wherein the DPD RF transceiver integrated circuit comprises a baseband processing module that is configured to implement at least one of:
digital pre-distortion (DPD) functionality;
crest factor reduction (CFR) functionality;
inverse fast Fourier transform (iFFT) functionality;
digital up conversion (DUC) functionality;
digital down conversion (DDC) functionality; and
fast Fourier transform (FFT) functionality.

\* \* \* \* \*